(12) United States Patent
Studebaker, Jr.

(10) Patent No.: US 11,497,170 B1
(45) Date of Patent: Nov. 15, 2022

(54) INLINE HAY TRAILER BRACING DEVICE, SYSTEM AND METHOD FOR REAR-LOADING PROCEDURES

(71) Applicant: Robert L. Studebaker, Jr., Tulsa, OK (US)

(72) Inventor: Robert L. Studebaker, Jr., Tulsa, OK (US)

(*) Notice: Subject to any disclaimer, the term of this patent is extended or adjusted under 35 U.S.C. 154(b) by 0 days.

(21) Appl. No.: 17/308,597

(22) Filed: May 5, 2021

Related U.S. Application Data (60) Provisional application No. 63/021,452, filed on May 7, 2020.

(51) Int. Cl.
*A01D 90/08* (2006.01)
*B60D 1/48* (2006.01)

(52) U.S. Cl.
CPC ............ *A01D 90/083* (2013.01); *B60D 1/48* (2013.01)

(58) Field of Classification Search
CPC .......... A01D 90/083; B60D 1/48; B60D 1/66; B60D 1/44; E02F 9/085; B60T 7/20; B60T 8/56; B66C 23/80; B66C 23/78
USPC ............... 414/481, 482, 111, 132, 245, 24.6; 280/763.1, 475; 292/338; 248/351, 357; 248/188.8, 188.9; 254/424, 418, 421; 212/305, 301, 302; 293/114; 188/5, 6, 7
See application file for complete search history.

(56) References Cited

U.S. PATENT DOCUMENTS

| | | | | |
|---|---|---|---|---|
| 1,719,313 A * | 7/1929 | Scott | ....................... | E02F 9/085 188/7 |
| 2,695,682 A * | 11/1954 | Ehlinger | ................... | B60T 1/14 188/5 |
| 3,733,051 A * | 5/1973 | Bollinger | .................. | B60S 9/04 254/94 |
| 3,951,383 A * | 4/1976 | Tenney, Jr. | ................ | B60S 9/04 254/94 |
| 4,369,989 A * | 1/1983 | Mankey | ................... | E02F 9/085 254/94 |
| 7,357,063 B2 * | 4/2008 | Balbo | ..................... | F41A 23/32 89/40.01 |
| 7,950,675 B1 * | 5/2011 | Quenzi | ................... | B60P 1/027 180/209 |
| 9,440,623 B2 * | 9/2016 | Pitts | .......................... | B60S 9/04 |

* cited by examiner

*Primary Examiner* — Gregory W Adams
(74) *Attorney, Agent, or Firm* — Frederic Dorwart, Lawyers PLLC; Penina Michlin Chiu (57) ABSTRACT

An inline hay trailer bracing device, system and method for rear-loading procedures. An inline hay trailer bracing system includes a bracing device configured to moveably attach to a chassis of a trailer bed, the bracing device including a pair of elongate legs, each leg including a first end having an opening configured to couple to a pin extending therethrough such that the leg pivots around the pin, a foot opposite the first end, the foot including a beveled edge, and a pad above the beveled edge, wherein each leg is pivotable around its respective pin between: a travel position, wherein the foot is raised substantially parallel to the chassis, and a loading position, wherein the beveled edge is configured to engage into a ground, and wherein in the loading position the bracing device is configured to brace the inline trailer bed during rear-loading procedures.

6 Claims, 8 Drawing Sheets

INLINE HAY TRAILER BRACING DEVICE, SYSTEM AND METHOD FOR REAR-LOADING PROCEDURES

CROSS REFERENCE TO RELATED APPLICATIONS

This Applications claims the benefit of U.S. Provisional Application No. 63/021,452 to Studebaker, filed May 7, 2020 and entitled "STABILIZER SYSTEM AND METHOD FOR INLINE HAY TRAILERS," which is hereby incorporated by reference in its entirety.

BACKGROUND OF THE INVENTION

1. Field of the Invention

Embodiments of the invention described herein pertain to the field of hay trailers. More particularly, but not by way of limitation, one or more embodiments of the invention enable an inline hay trailer bracing device, system and method for rear-loading procedures.

2. Description of the Related Art

Hay trailers, also sometimes called bale trailers, transport bales of hay. Typically, the trailer hitches to a pickup truck, and the pickup truck pulls the trailer behind the truck. The bales of hay are loaded onto the trailer from the rear by a tractor, which slides a bale onto the back of the trailer. Where the trailer can carry multiple bales, the hay trailers are long and thin, and the bales are loaded one at a time in succession "inline", with each successive bale pushing earlier bales forward along the trailer bed. Typically, single-row hay trailers are preferred, since single-row trailers are more likely to be legal on public roads. However, in some instances, multi-bale hay trailers can have a "double row" of bales. For double row trailers, the bales are loaded inline from the rear into each row.

Round hay bales can typically weigh about 800 pounds each, with a single-row inline bale trailer capable of carrying as many as eleven bales in single file. A common problem with inline hay trailers is that, in the loading process, as the tractor pushes the bales forward, the loading tractor tends to push the trailer and the attached pickup truck, causing the truck to jerk forward as the bales are loaded from the rear. This forward movement while the truck is parked, damages the transmission of the truck.

A similar problem occurs if the ground is wet, muddy or otherwise slick. In this instance, there is usually no transmission damage, but even if the trailer brakes are set, the loading process pushes or slides the rig forward like a sled, and makes it difficult to load the last two or three bales.

Farmers or ranchers sometimes try to solve the jerking or sliding problem by scotching the wheels of the trailer, using wheel chocks and/or jackknifing the pickup. But these approaches are not reliably effective and waste time during implementation. For example, because the bales are so heavy and the tractor pushes with such force, trailers will typically roll right over conventional wheel chocks as if the chocks were not there. Jackknifing is time consuming and still does not prevent the rig from sliding forward on wet or muddy terrain.

As is apparent from the above, current inline hay trailers suffer from jerking and sliding during loading. Therefore, there is a need for an inline hay trailer bracing device, system and method for rear-loading procedures.

BRIEF SUMMARY OF THE INVENTION

One or more embodiments of the invention enable an inline hay trailer bracing device, system and method for rear-loading procedures.

An inline hay trailer bracing device, system and method for rear-loading procedures is described. An illustrative embodiment of a hay trailer includes a trailer bed configured to carry a plurality of bales in single-file, a plurality of wheels coupled to a chassis of the trailer bed, a bracing device moveably attached to the chassis, the bracing device including at least one elongate leg including a first end and a foot opposite the first end, and the first end pivotably coupled to the chassis, such that the leg pivots between a travel position wherein the foot is raised above a ground in the travel position and a loading position wherein the foot digs into the ground in the loading position and wherein the at least one elongate leg extends forward of at least one wheel of the plurality of wheels in the loading position and braces the trailer bed during loading of a bale of the plurality of bales onto the trailer bed. In some embodiments, the foot includes a beveled edge, a cover plate secured over the beveled edge, and a pad extending circumferentially around the elongate leg above and proximate to the cover plate, the pad arranged substantially perpendicular to the cover plate, and wherein in the loading position the beveled edge of the foot digs into the ground. In some embodiments, the pad is configured to limit a depth that the beveled edge digs into the ground. In certain embodiments, the hay trailer further includes a tow vehicle coupled in front of the trailer bed, the bracing device moveably attached to the chassis between the plurality of wheels and the tow vehicle such that the foot extends towards the tow vehicle such that the foot extends towards the tow vehicle at an acute angle with the ground. In certain embodiments, the plurality of wheels are arranged in two rows and one elongate leg of the at least one elongate leg extends in front of each row of the two rows. In certain embodiments, the bracing device further includes a first plate coupled to the chassis on a first side of the first end, and a second plate coupled to the chassis on a second side of the first end, and wherein a pin extends through the first plate, the first end and the second plate, and the at least one elongate leg pivots around the pin to move between the travel position and the loading position. In some embodiments, the first plate includes a first upper aperture below the pin and a first lower aperture below the pin, and the second plate includes a second upper aperture below the pin and a second lower aperture below the pin, the first upper aperture horizontally aligned with the second upper aperture and the first lower aperture horizontally aligned with the second lower aperture. In certain embodiments, a rod extends through the first upper aperture and the second upper aperture when the at least one elongate leg is in the travel position, and the rod extends through the first lower aperture and the second lower aperture when the at least one elongate leg is in the loading position. In some embodiments, a clip removably secures the rod in one of the travel position or the loading position. In certain embodiments, the at least one elongate leg includes a pair of elongate legs coupled together by a connecting bar. In some embodiments, in the loading position, the at least one elongate leg extends at an acute angle with the ground.

An illustrative embodiment of an inline hay trailer bracing system for rear-loading procedures includes a bracing device configured to moveably attach to a chassis of an inline trailer bed, the bracing device including a pair of elongate legs, each elongate leg of the pair of elongate legs, including a first end having an opening, the opening configured to couple to a pin extending therethrough such that the elongate leg pivots around the pin, a foot opposite the first end, the foot including a beveled edge, and a pad extending around the elongate leg above the beveled edge, wherein each leg is pivotable around its respective pin between: a travel position, wherein the foot is raised substantially parallel to the chassis in the travel position, and a loading position, wherein the beveled edge is configured to engage into a ground in the loading position, and wherein in the loading position the bracing device is configured to brace the inline trailer bed during rear-loading procedures. In some embodiments the inline hay trailer bracing system further includes a pair of plates coupled to the chassis on either side of each elongate leg of the pair of elongate legs, each plate of the pair of plates including a set of three apertures aligned with corresponding apertures on its paired plate, wherein the first end is positioned between the pair of plates and the pin extends through a first aperture of the set of three apertures of the pair of plates and the opening. In certain embodiments, the inline hay trailer bracing system further includes a rod moveable between a second aperture of the set of three apertures and a third aperture of the set of three apertures wherein in the travel position, the rod extends through the second aperture and underneath the elongate leg to secure the elongate leg in the travel position, and wherein in the loading position, the rod extends through the third aperture and is configured to prevent the elongate leg from overrotation. In some embodiments, the first aperture of the set of apertures is an upper aperture of the pair of plates, the second aperture of the set of apertures is the middle aperture of the set of plates, and the third aperture of the set of apertures is a bottom aperture of the set of plates. In certain embodiments, each plate is rounded and the set of apertures are arranged circumferentially around each plate of the pair of plates. In some embodiments, a fastener removably secures the rod in one of the second aperture or the third aperture. In certain embodiments, the bracing device is configured to attach to the chassis such that each leg of the pair of legs extends forward of a wheel of the inline trailer bed. In some embodiments, in the loading position, the pad extends substantially parallel to the ground and is configured to prevent its respective elongate leg from sinking into the ground further than a position where the pad contacts the ground. In certain embodiments, each leg of the pair of elongate legs is hollow, and the foot further includes a cover plate extending over the beveled edge, the cover plate arranged about perpendicularly to the pad. In some embodiments, in the loading position, each leg of the pair of elongate legs extends at an acute angle with the ground. In certain embodiments, the inline hay trailer bracing system further includes a rod secured below at least one leg of the pair of elongate legs in the loading position, the rod configured to maintain the acute angle.

An illustrative embodiment of a method of rear-loading a plurality of bales onto an inline hay trailer includes parking a hay trailer on a soft ground, the hay trailer having a pair of legs of a bracing device in a travel position, each leg of the pair of legs coupled to the hay trailer by a pair of mounting plates, removing a rod from an upper aperture of the pair of mounting plates to unlock the pair of legs, the upper aperture positioned below each leg of the pair of legs in the travel position, pivoting the unlocked pair of legs of the bracing device from a travel position into a loading position such that feet of the pair of legs extend down from the chassis towards a tow vehicle at an acute angle with a soft ground, and the feet dig into the soft ground, placing each rod into a lower aperture of the respective pair of mounting plates, the lower aperture of the pair of mounting plates positioned below each leg of the pair of legs in the loading position, loading hay bales in a single-file onto a rear of the hay trailer while the bracing device is in the loading position, removing each rod from the lower aperture of the pair of mounting plates and pivoting the pair of legs of the bracing device from the loading position into the travel position, replacing each rod in the upper aperture of the pair of mounting plates, and driving the loaded hay trailer.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

An inline hay trailer bracing device, system and method for rear-loading procedures will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a leg includes one or more legs.

As used in this specification and the appended claims, "coupled" refers to either a direct connection or an indirect connection (e.g., at least one intervening connection) between one or more objects or components. The phrase "directly attached" means a direct connection between objects or components.

One or more embodiments of the invention provide an inline hay trailer bracing device, system and method for rear-loading procedures. While for ease of description and so as not to obscure the invention, illustrative embodiments are described in terms of a hay trailer, nothing herein is intended to limit the invention to that embodiment. The invention may be applied equally to other types of rear-loading vehicles that may slip or jerk forward when being loaded with cargo, for example rear-loaded heavy cargo weighing hundreds of pounds such as bales of hay or bales of cotton, cargoes loaded from the rear by tractor and/or other similar situations where use of conventional wheel chocks would be ineffective and/or where conventional trailer brakes located in the wheel hub would be insufficient to prevent movement of the vehicle during rear-loading.

Illustrative embodiments include an inline hay trailer bracing device, system and method for rear-loading procedures. The bracing device may be external to the wheels, and may prevent a trailer from slipping or being pushed forward during rear-loading of the hay trailer with cargo. A bracing device may be attached to the underside of a trailer, such as to the chassis, wheel base, trailer frame, base frame and/or a dedicated rail or beam at a location where the bracing device may extend in front of one or more wheels of the trailer. The bracing device may include one or more moveably attached legs that are pivotable between a travel position and a loading position. The free end or "foot" of the legs may include a beveled edge, and the legs may pivot into the loading position such that the pointed edge of the legs may dig into the ground and/or the leg may brace against the ground, which may limit and/or prevent the trailer from undesirably moving forward during rear-loading procedures. A removeable locking rod may secure the legs in the travel or loading position.

The bracing device of illustrative embodiments may limit the forward movement of the trailer despite force from a tractor and/or heavy load pushing the trailer from behind. In the loading position, the locking rod may support the leg and may prevent the leg from undesirably folding and/or undesirable over-rotation. When finished loading, the locking rod may be removed, the leg may be rotated to lift the foot off the ground, and the locking rod may be reinserted to secure the leg in the travel position. In the travel position, the hay trailer may travel unimpeded with the bracing device still attached.

A pad may be placed one, two, a few and/or several inches from the bottom of the leg and arranged with a flat area parallel or about parallel to the ground. The pad may prevent the leg from sinking into the ground if the ground is soft and/or provide surface area to support the heavy load. A cover plate may cover the beveled edge of the leg, which may prevent dirt from entering the leg in embodiments where the leg is hollow and/or provide additional strength to the beveled edge for example if the ground is rocky. In some embodiments, the bracing system may include a spring to assist in returning the legs from the loading position to the transport position. The bracing device of illustrative embodiments may include two legs, one on each side of the trailer and/or one in front of each row of wheels. In certain embodiments, both legs may be actuated simultaneously, for example with a connecting bar that extends between the legs.

Figure 1:
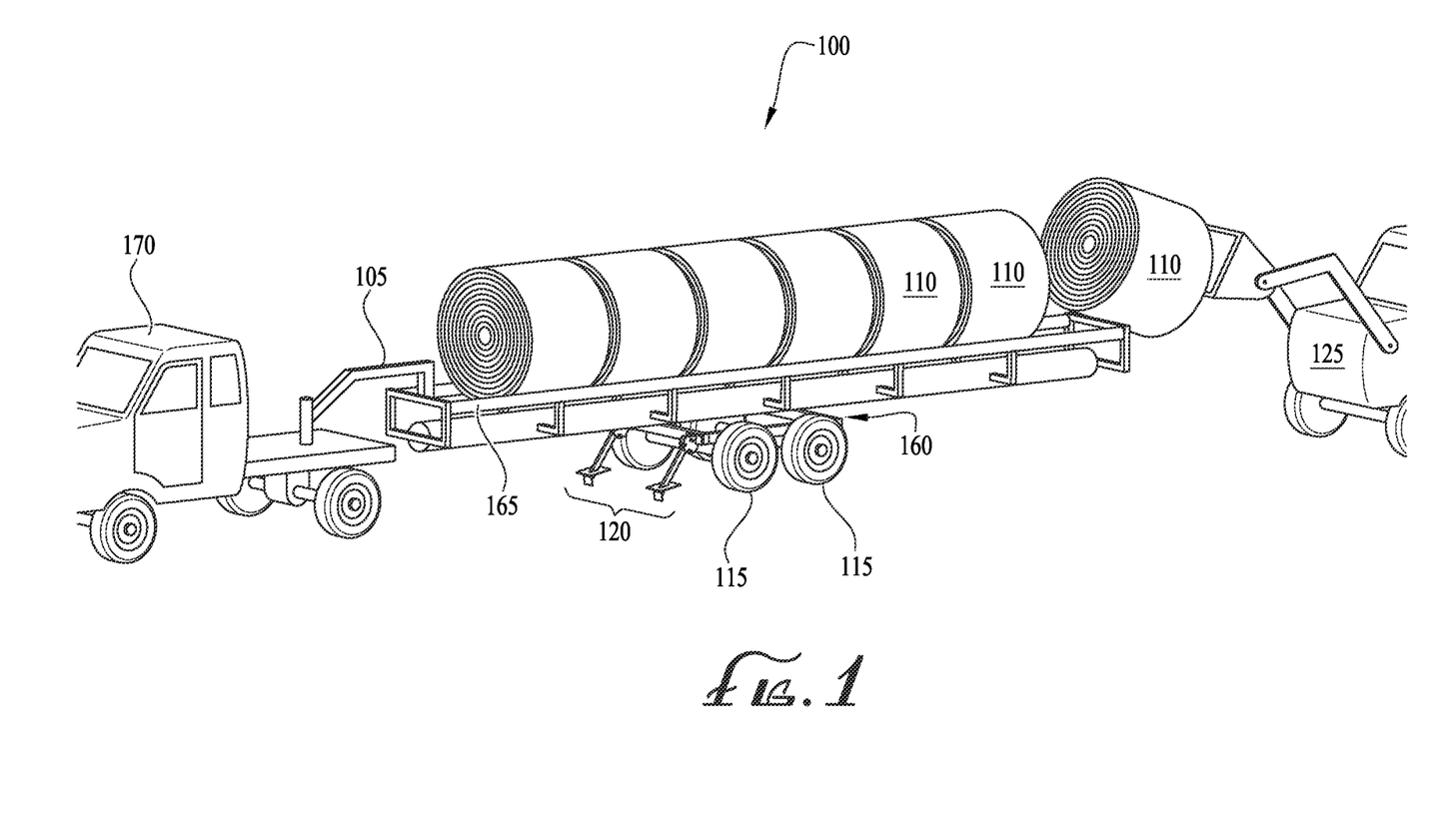
FIG. 1 is a perspective view of a hay trailer of illustrative embodiments being loaded with exemplary bales.

FIG. 1 illustrates a hay trailer of an illustrative embodiment. Hay trailer 100 may be an inline hay trailer with a single row or a double row cradle, a bale trailer and/or any other trailer that is rear-loaded with cargo that may be pushed forward from behind the trailer. Hay trailer 100 may include hitch 105 which may be a gooseneck hitch, bumper hitch, fifth-wheel type hitch and/or any other type of hitch known to those of skill in the art. Trailer 100 may be hitched to and/or pulled by tow vehicle 170. Tow vehicle 170 may be a truck, pickup truck, a semi-trailer, a tractor and/or another similar vehicle capable of towing hay trailer 100. Bed 165 may be a cradle for cargo and may be long and thin and capable of carrying a plurality of hay bales 110 or other cargo in one or more rows in single file. Hay trailer 100 may include a plurality of trailer wheels 115. Trailer wheels 115 may be attached by flanges and axles to chassis 160. In FIG. 1, bracing device 120 is shown extending forward of front-most pair of wheels 115 of trailer 100. In some embodiments, bracing device 120 may be placed in front of and/or forward of at least one trailer wheel 115. For example, for a trailer 100 that has two wheels 115 at the front of trailer 100 and two wheels 115 at the back of trailer 100, bracing device 120 may be secured in front of the two wheels 115 at the back and behind the two wheels 115 at the front of trailer 100. In some embodiments, bracing device 120 may be placed in front of the front-most trailer wheels 115, with all wheels 115 of trailer 100 behind bracing device 120. In FIG. 1, tractor 125 is shown at the back of trailer 100 loading hay bales 110 inline from behind trailer 100.

Figure 2:
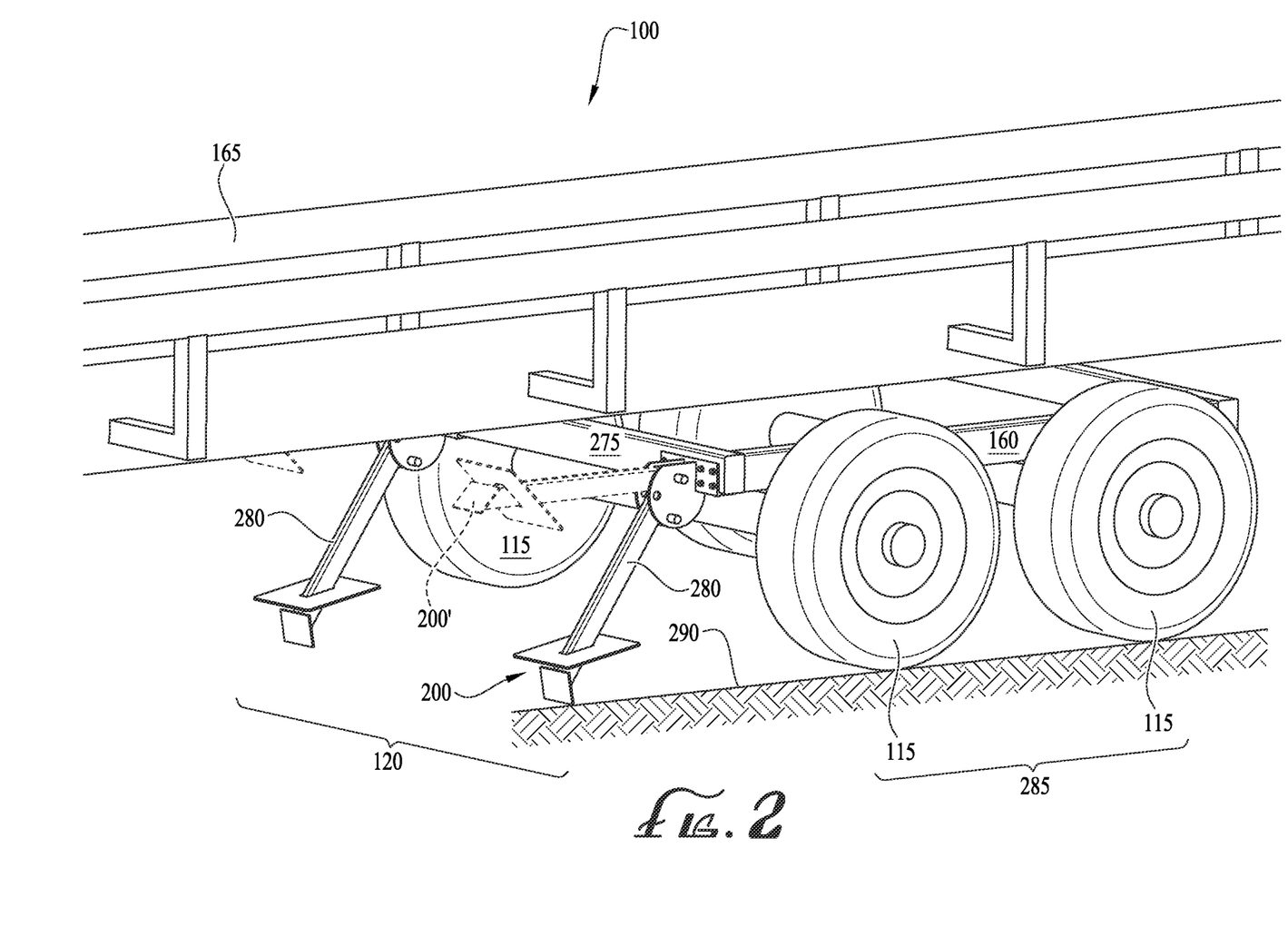
FIG. 2 is a perspective view of a bracing device of an illustrative embodiment attached to a chassis of a hay trailer of illustrative embodiments.

Turning to FIG. 2, bracing device 120 may be external to trailer wheels 115 and attached to transverse member 275 on the underside of trailer 100. Transverse member 275 may be a portion of the frame of trailer 100, chassis 160, the base of trailer wheels 115 and/or a secure rod, bar, tube, pipe, rail or beam on the underside of trailer 100. In FIG. 2, bracing device 120 is shown proximate to trailer wheels 115. Other locations on underside of trailer 100 are also contemplated herein, such as at the front or back of the frame of trailer 100. Bracing device 120 may include one or more pivotable legs 280 which may adjust, rotate and/or pivot from loading position 200 to travel position 200', and vice versa. In the embodiment shown in FIG. 2, a pair of pivotable legs 280 is shown with one leg 280 aligned in front of each row 285 of trailer wheels 115. In some embodiments, a single leg 280 may be aligned in between two rows 285 of trailer wheels 115 and/or a single leg 280 may be centered widthwise on transverse member 275. One or more pivotable legs 280 of bracing device 120 may brace, wedge, pierce and/or dig into ground 290 in loading position 200, which may prevent or limit trailer 100 from slipping or being pushed forward during rear-loading. Ground 290 may be dirt, grass, sod, mud, clay, turf and/or another soft or slick surface which may be penetrable by legs 280 in loading position 200. In travel position 200', legs 280 may be secured off the ground to allow hay trailer 100 to travel unimpeded by bracing device 120.

Figure 3:
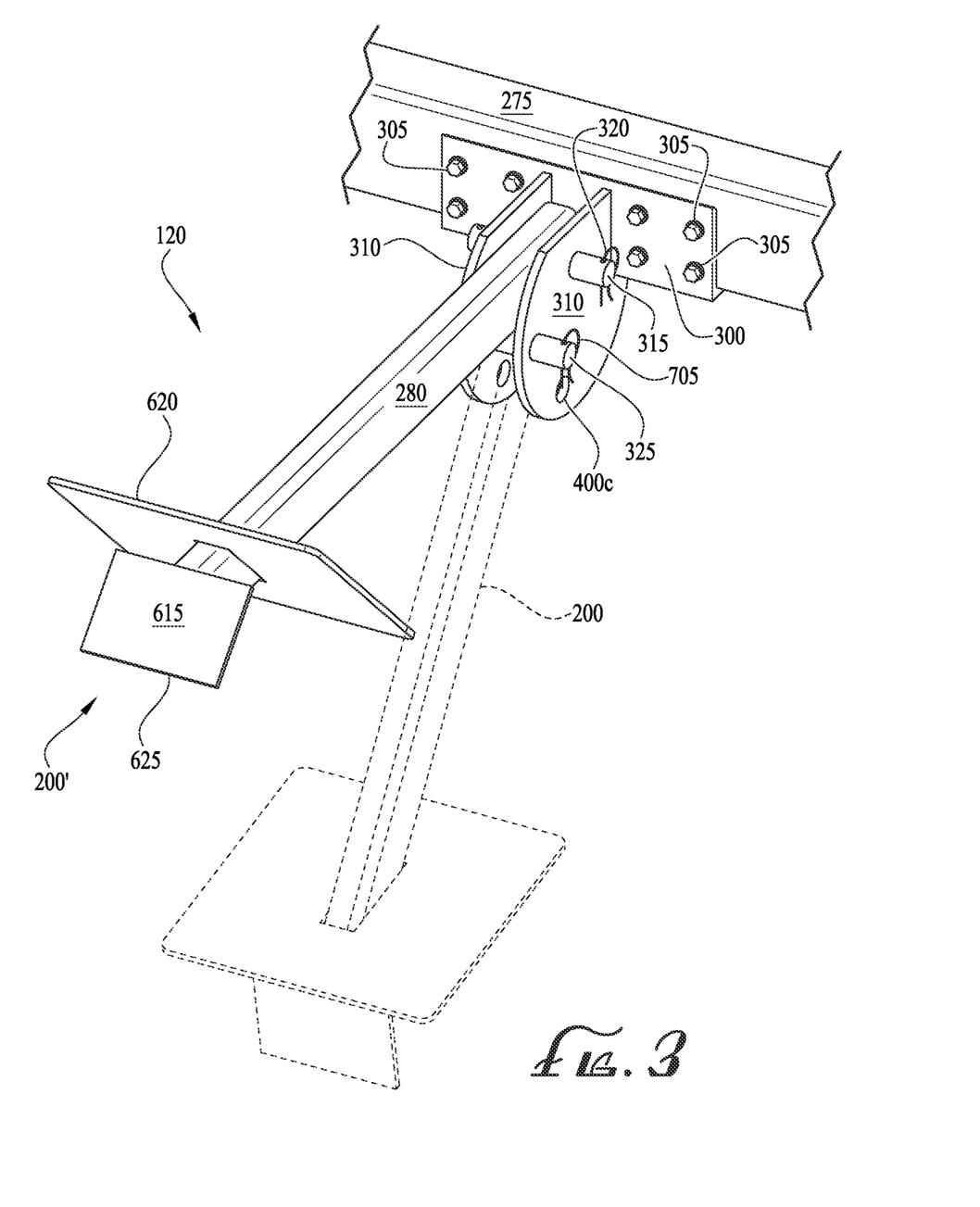
FIG. 3 is a perspective view of a bracing device of illustrative embodiments.

FIG. 3 illustrates bracing device 120 in travel position 200' and alternatively in loading position 200. Bracing device 120 may be directly attached to and/or coupled to transverse member 275. Transverse member 275 may extend in front of one, some or all trailer wheels 115 along at least a portion of the width of trailer 100. Transverse member 275 may be a portion of chassis 160, trailer frame and/or bed 165, and/or may be any beam, bar, pipe, rail or other element extending widthwise or substantially widthwise across the underside and/or on the base frame of trailer 100 between one or more trailer wheels 115 and tow vehicle 170. In illustrative embodiments, transverse member 275 may be a portion of chassis 160 of trailer 100 and/or the frontmost crosswise rail of chassis 160. Bracket 300 may provide a mounting for leg 280 and/or bracing device 120 onto trailer 100. Bracket 300 may be an "L" bracket and may be connected to front and bottom of transverse member 275 in an exemplary embodiment. In some embodiments, screw 305 or a plurality of screws 305 may secure bracket 300 to transverse member 275. Bracket 300 may allow bracing device 120 to be attached to any trailer 100 without any additional modifications other than the attachment of bracing device 120 itself. In some embodiment, bracing device 120 and/or bracket 300 may be welded to transverse member 275 and screw 305 may be additional or may not be necessary. In some embodiments screw 305 may be a self-tapping screw or a self-drilling screw. In self-drilling screw embodiments, pre-drilled holes 710 (shown in FIG. 7) may not be necessary. In certain embodiments, bolts may be employed rather than screw 305. Those of skill in the art will appreciate that other similar attachment means to securely attach bracing device 120 to transverse member 275 are contemplated herein.

Leg 280 may be a pipe, bar, tube with a round, square or rectangular cross-section, made of steel, pultruded fiber reinforced plastic and/or another similar strong, durable, rust-resistant material known to those of skill in the art of hay trailers. A pipe, tube or hollow embodiment may provide desired strength, but reduced weight as compared to a solid bar. In the embodiment shown in FIG. 3, leg 280 is a tube having a square cross-sectional area.

Figures 4, 5, 6:
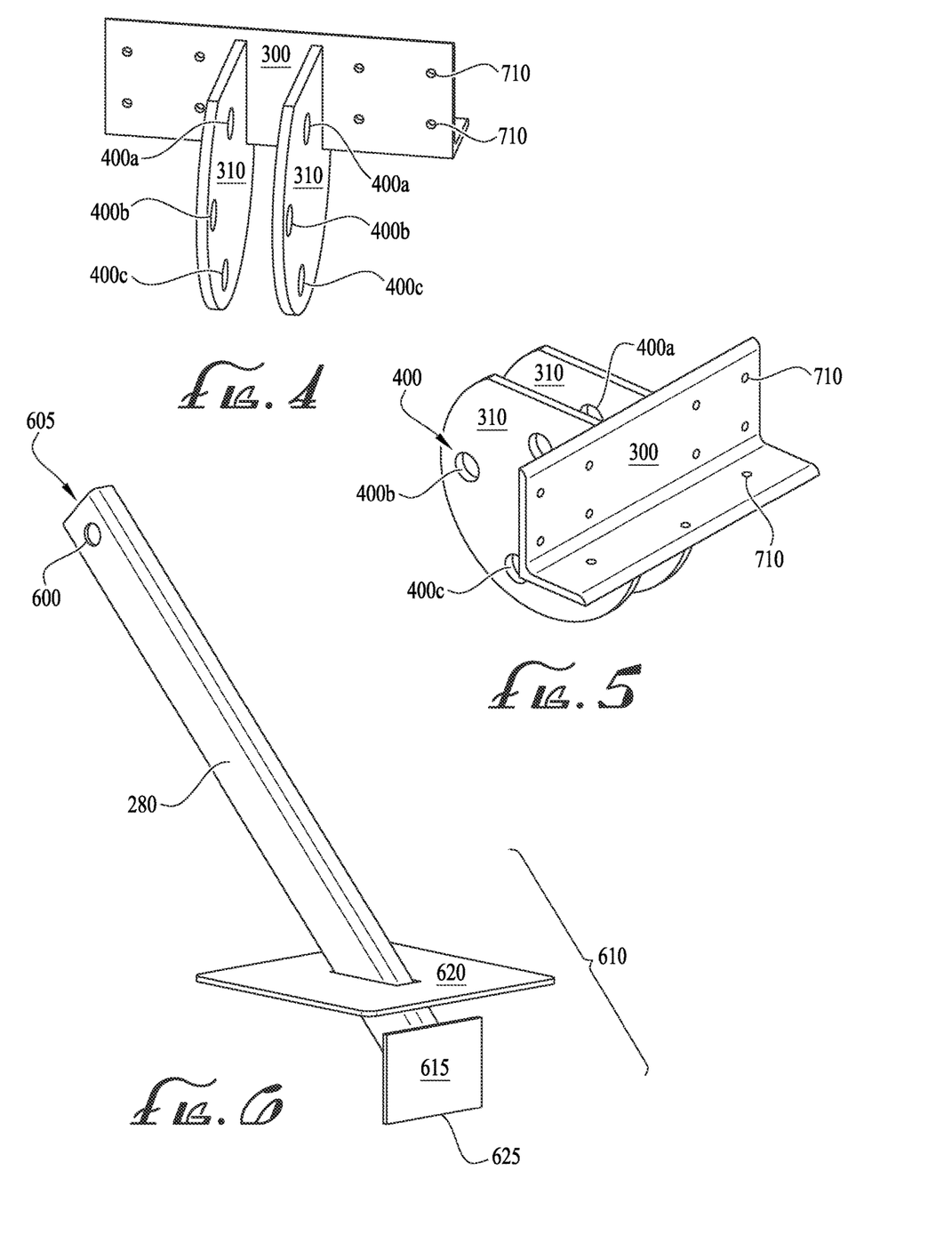
FIG. 4 is a perspective view of an exemplary bracket and pair of plates of a bracing device of illustrative embodiments.
FIG. 5 is a perspective view of an exemplary bracket and pair of plates of a bracing device of illustrative embodiments.
FIG. 6 is a perspective view of a leg of illustrative embodiments.

Leg 280 of bracing device 120 may be positioned between a pair of mounting plates 310. FIG. 4 and FIG. 5 illustrate a mounting plate of illustrative embodiments. Mounting plate 310 may be rounded discs with a cutout that mates with bracket 300. The cutout of each plate 310 may mate with the front and bottom of L bracket 300, such as by welding, adhesive or other similar attachment. Each mounting plate 310 may include one or more apertures 400. In FIG. 4, a set of three apertures 400 in each mounting plate 310 is shown: upper aperture 400a, middle aperture 400b and lower aperture 400c. The arrangement of apertures 400 may be the same in each plate 310 in a pair of plates 310 that sandwich and/or sit on either side of leg 280, such that corresponding apertures 400 of opposing plates 310 may be horizontally aligned. Apertures 400 may be arranged circumferentially around plate 310 and/or dispersed around plate 310. Pin 315 (shown in FIG. 3) or a rod may extend through one of corresponding apertures 400a, 400b, or 400c in both of the respective mounting plates 310 in a pair, and may remain horizontal and/or parallel to ground 290 when inserted.

Plates 310 may stabilize leg 280 in a transverse direction (side to side). Bracket 300 may include a plurality of holes 710. Screws 305 may be threaded through holes 710 in bracket 300 and corresponding holes 710 on transverse member 275 to connect bracket 300 to transverse member 275. Alternatively, bracket 300 may be welded onto transverse member 275, bolts may be employed instead of screws 305 and/or screws 305 may be self-drilling screws 305 and pre-drilled holes 710 may not be necessary. Leg 280 may pivot between plates 310 around pin 315, which pin 315 may serve as a pivot point.

Returning to FIG. 3, top aperture 400a may include pin 315 extending through a first mounting plate 310, leg 280 and second mounting plate 310. Pin 315 may extend through opening 600 (shown in FIG. 6) such that leg 280 may rotate and/or pivot around pin 315. Once installed, pin 315 may remain attached and may serve as a pivot point for leg 280 in both loading position 200 and travel position 200'. Clip 320 may secure pin 315 in place and may prevent movement and/or loosening of pin 315, for example when jostled during loading or travel. In some embodiment, one clip 320 may be secured on each end of pin 315. In some embodiments, pin 315 may be secured by bolt, by friction fit, or by welding, rather than or in addition to clip 320. As shown in FIG. 6, leg 280 may include opening 600 proximate to upper end 605 of leg 280 and/or the end of leg 280 opposite of foot 610. Pin 315 may extend through opening 600, as well as apertures 400a in plates 310 to form a pivot point and/or enable leg 280 to pivot and/or rotate around pin 315. In some embodiments, pin 315 may be integral to plates 310 and aperture 400a may not be necessary.

As shown in FIG. 3, when leg 280 is in travel position 200', rod 325 may extend through middle aperture 400b to hold leg in travel position 200' and/or ensure leg 280 does not prematurely pivot, lower and/or move. In travel position 200', foot 610 may be raised to the height of transverse member 275, leg 280 may be parallel or about parallel with ground 290 and/or foot 610 may be raised off of ground 290. When leg 280 is in loading position 200, as shown in FIG. 2 and FIG. 9B, rod 325 may be moved from middle aperture 400b to lower aperture 400c. In loading position 200, lower aperture 400c may be below leg and the placement of rod 325 in aperture 400c may prevent leg 280 from undesirably folding and/or prevent over-rotation as force is placed onto leg 280 during loading procedures. In loading position 200, leg 280 may pierce ground 290 at an acute angle Θ and/or form an acute angle θ with the portion of ground 290 behind leg 280 and/or to the rear of leg 280 (e.g., the area of ground 290 between leg 280 and at least one wheel 115 behind leg 280 and/or between leg 280 and the rear of trailer 100), for maximum stability, such as a 40°, 45° or 60° angle. When placed in lower aperture 400c, rod 325 may maintain leg 280 at acute angle Θ. Rod may be secured in one of aperture 400b or 400c by fastener 705.

Figure 7:
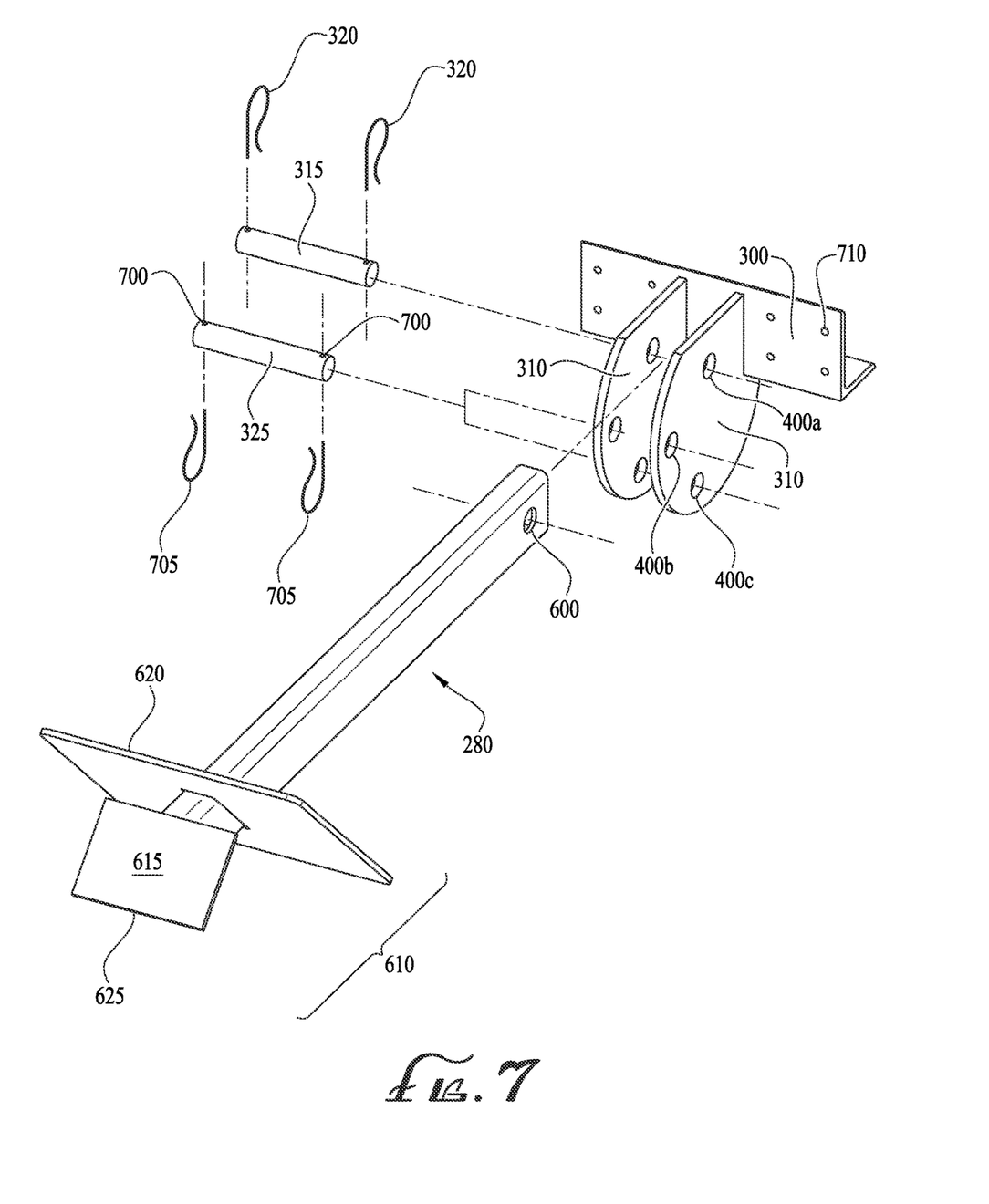
FIG. 7 is an exploded view of an exemplary leg attachment of a bracing device of illustrative embodiments.

As shown in FIG. 7, rod 325 may include channels 700 extending radially through each end and/or proximate to each end, to mate with fasteners 705. One or more fasteners 705 may removably secure rod 325 in place until it is time for leg 280 to transition to an alternate position. For example, rod 325 may be threaded and fasteners 705 may be bolts, or fasteners 705 may be clips or clamps, for example. Fasteners 705 may be removeable such that rod 325 may be repeatedly moved between middle aperture 400b and lower aperture 400c, as desired each time that trailer 100 is loaded or travels. FIG. 7 also illustrates holes 710, which may be dispersed around, across and/or throughout bracket 300 for attachment of bracket to transverse member 275 and/or to the frame of hay trailer 100.

FIG. 6 and FIG. 7 show foot 610 of illustrative embodiments. Foot 610 may include beveled edge 900 best illustrated in FIGS. 9A and 9B. Where leg 280 is hollow and/or a tube, cover plate 615 may be a cap or cover secured over beveled edge to prevent dirt or debris from entering leg 280. In some embodiments, cover plate 615 may provide additional reinforcement for leg 280 to dig and/or wedge into ground 290. In certain embodiments, cover plate 615 may not be necessary, such as where leg 280 is solid or includes a solid portion, rather than hollow. Pad 620 may be a plate and/or pad arranged such that pad 620 is substantially parallel to ground 290 when leg 280 is in loading position 200. Pad 620 may be placed one, two, a few or several inches above beveled edge 900, such as two or six inches from beveled edge 900. Pad 620 may have a large surface area, such as twelve inches by twelve inches square, ten inches square or fourteen inches square in illustrative embodiments, and may act as a barrier to limit the depth that foot 610 digs, sinks and/or pierces into ground 290, for example when ground is soft. The dimensions of pad 620 may depend on the dimensions of leg 280, the anticipated consistency of ground 290 and/or the anticipated maximum force carried by bracing device 120. Cover plate 615 may be aligned with and cover beveled edge 900 and/or be arranged substantially perpendicularly with respect to ground 290 when bracing device 120 is in a loading position and/or at an acute angle θ with portion of ground 290 rear of leg 280. Cover plate 615 may cover the end of leg 280 and may prevent dirt or debris from entering the inside of leg 205 where leg is hollow, for example in tube embodiments. Distal edge 625 of cover plate 615 may assist in piercing or digging into ground 290, thereby wedging leg 280 into ground 290 as cargo is loaded onto the rear of trailer 100. Foot may assist in stabilizing leg 280 and/or and trailer 100 when force is applied during rear-loading procedures.

Figure 8:
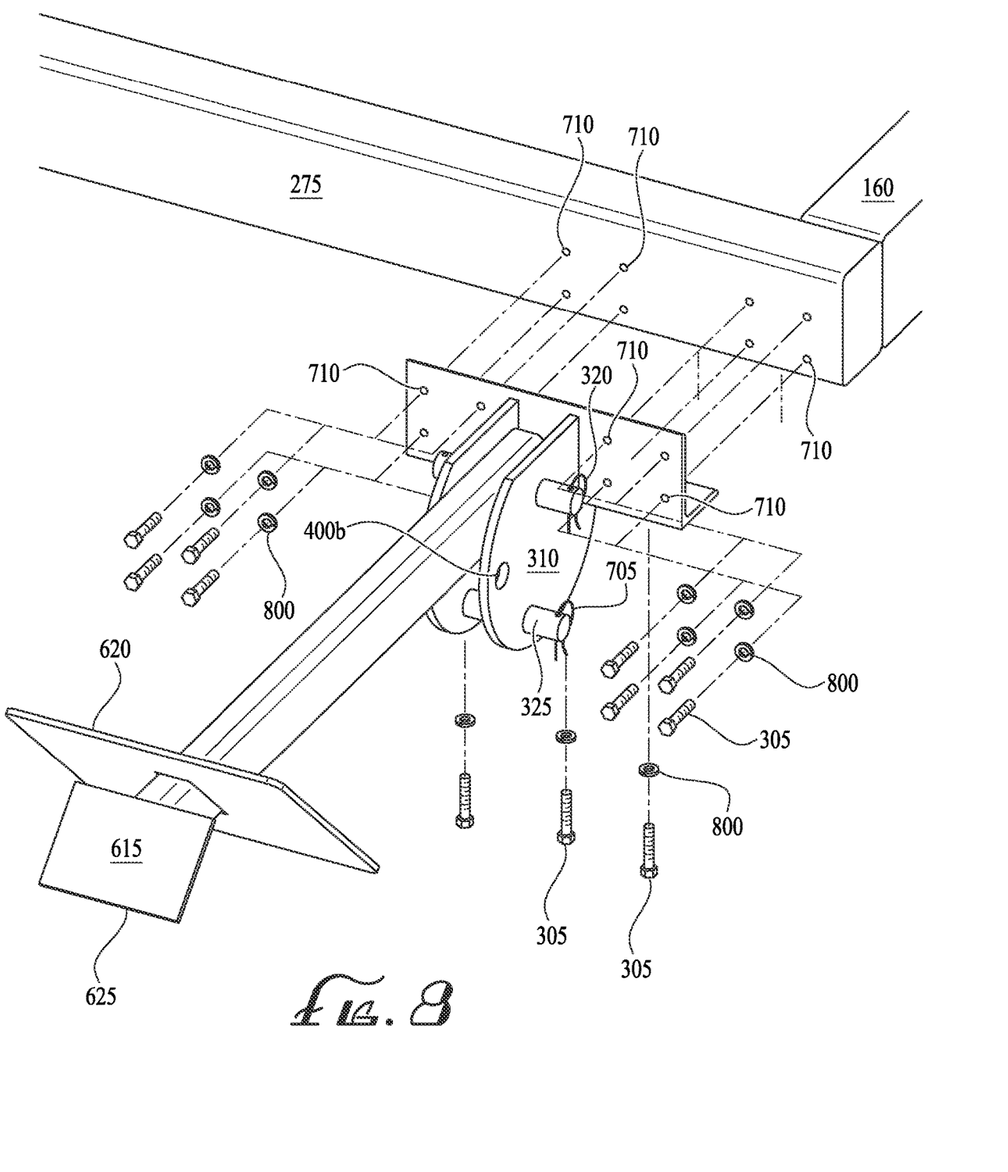
FIG. 8 is an exploded view of a mounting system of a bracing device of illustrative embodiments.

FIG. 8 illustrates an exemplary attachment of bracing device 120 onto chassis 160 and/or transverse member 275. A plurality of screws 305 may extend through holes 710 on bracket 300 and transverse member 275 on both the front and bottom of bracket 300 and/or transverse member 275 and secured into place with screws 305 to firmly attach bracing device 120 onto transverse member 275, chassis 160 and/or the frame of trailer 100. Holes 710 may be drilled through transverse member 275 and bracket 300 for ease of attachment. Washers 800 may prevent screws 305 from backing out of place. In some embodiments, bracket 300 may be welded directly to transverse member 275, screws may be employed rather than bolts, or another fastening means well known to those of skill in the art may be employed. Where bracing device 120 includes a plurality of legs 280, the attachment system of FIG. 8 may be employed for each leg 280.

In order to install bracing device 120 of illustrative embodiments onto hay trailer 100, first a hole 710 placement template may be placed onto chassis 160, transverse member 275 and/or other location of base frame of hay trailer 100 where bracing device 120 may be installed. Using the template, marks for the locations of holes 710 may be added. Holes 710 may then be drilled in the marked locations, such as in on nonlimiting example 5/16 inch holes. Bracket 300 with attached plates 310 may then be mounted onto base frame and/or transverse member 275 at the location of holes 710 with screws 305 and washers 800. In some embodiments, bracket 300 with plate 310 may be welded to transverse member 275 and/or trailer frame. Opening 600 in leg 280 may then be aligned with upper aperture 400a of plate 310, and pin 315 slid through opening 600 and apertures 400a. These steps may then be repeated for any additional legs 280 in bracing device 120.

Figure 9A:
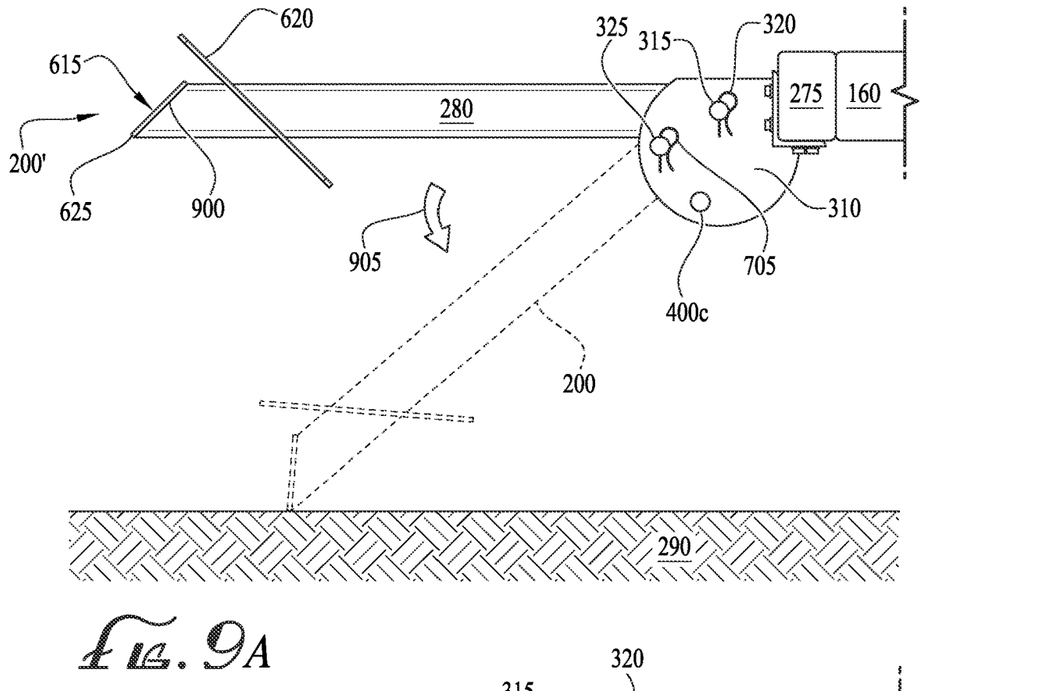
FIG. 9A is a side elevation view of a bracing device of illustrative embodiments in an exemplary travel position.
Figure 9B:
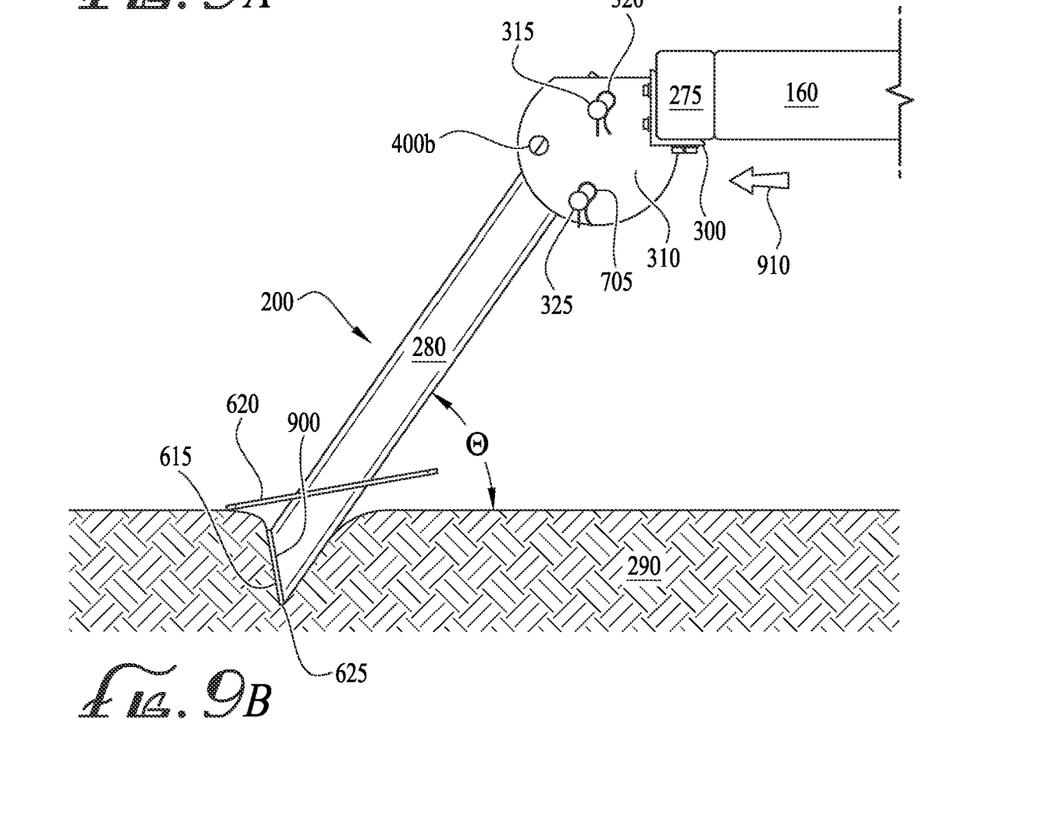
FIG. 9B is a side elevation view of a bracing device of illustrative embodiments in an exemplary loading position.

FIGS. 9A and 9B show the alternate positions of bracing device 120 of illustrative embodiments. FIG. 9A illustrates bracing device 120 in travel position 200' of illustrative embodiments, and FIG. 9B illustrates bracing device 120 in loading position 200 of illustrative embodiments. Arrow 905 illustrates movement and/or actuation of leg 280 from travel position 200' to loading position 200. When in travel position 200', leg 280 may be arranged such that foot 610, cover plate 615 and/or beveled edge 900 may be off ground 290. In travel position 200' hay trailer 100 may travel, with or without cargo, uninhibited despite attachment of bracing device 120. In some embodiments, leg 280 may be oriented parallel to ground 290 in travel position 200' and/or aligned with transverse member 275 in travel position 200'.

When in loading position 200, distal edge 625, at least a portion of beveled edge 900 and/or cover plate 615 may be wedged below the surface of ground 290. As force is applied in direction 910 as a result of hay bales 110 or other cargo being loaded onto the rear of trailer 100, distal edge 625, cover plate 615 and/or beveled edge 900 may dig into ground 290. In such exemplary manner, bracing device 120 may limit and/or prevent undesired forward movement of hay trailer 100 and/or tow vehicle 170 by acting as an external brake against motion and/or supplementing the internal brakes of trailer wheels 115. Bracing device 120 may secure trailer wheels 115, trailer 100 and/or tow vehicle 170 substantially in place, despite a heavy load, such as bales 110 being loaded onto the back of trailer 100 and being pushed forward during loading. Pad 620 may rest on surface of ground 290 and may prevent leg 280 from digging and/or sinking into ground 290 lower than the position of pad 620 by providing an increased surface area. Leg 280 may form about a 45° angle and/or an acute angle θ with portion of ground 290 behind leg 280 in loading position 200, an acute angle θ with ground 290 to the rear of leg 280 and/or be angled with respect to ground 290 to maximize stability. Pin 315 and its corresponding pin clips 320 may remain in place in aperture 400a in both travel position 200' and loading position 200. Pin 315 may be moveable in some embodiments, may be permanently secured in certain embodiments and/or may be integral to plate 310. Rod 325 may be secured in aperture 400b in travel position 200', and alternatively in aperture 400c in loading position 200, and may be moveable therebetween. Fasteners 705 may removably secure rod 325 in place once positioned so as not to prematurely actuate bracing device 120.

In certain embodiments, legs 280 may be manually pivoted between loading position 200 and travel position 200'. In some embodiments, an electric motor (not shown) may actuate bracing device 120 between travel position 200' and loading position 200. In some embodiments employing an electric motor, rod 325 may be manually removed, movement of legs 280 may be aided by the electric motor, and then rod 325 may be positioned as more specifically described herein. Those of skill in the art may appreciate that other aids to automate and/or assist with the movement and/or lifting of legs 280 are contemplated, for example, optional use of a crank or pulley system to assist transitioning from travel position 200' to loading position 200 and vice versa.

Removable rod 325 may be placed into middle aperture 400b to secure leg 280 into travel position 200'. For example, middle aperture 400b may be directly underneath leg 280 when leg 280 is in travel position 200' and/or supportive of leg 280 in travel position, and therefore, rod 325 so positioned may prevent downward pivot of leg 280 while rod 325 is so placed. Removable rod 325 may alternatively be placed through lower aperture 400c to secure leg 205 into loading position 200. More specifically, lower aperture 400c may be below leg 280 and/or directly below leg when leg 280 is positioned in loading position 200, and therefore rod 325 may prevent over-rotation of leg 280 when force is applied in direction 910. For example, rod 325 secured in lower aperture 400c may prevent acute angel Θ from increasing and/or from becoming a right angle or an obtuse angle during loading of cargo onto trailer 100. Rod 325 may be removed while leg 280 is being moved, actuated, rotated and/or pivoted into an alternate position. In some embodiments another similar stopping mechanism may be employed against over-rotation of leg 280.

Figure 10:
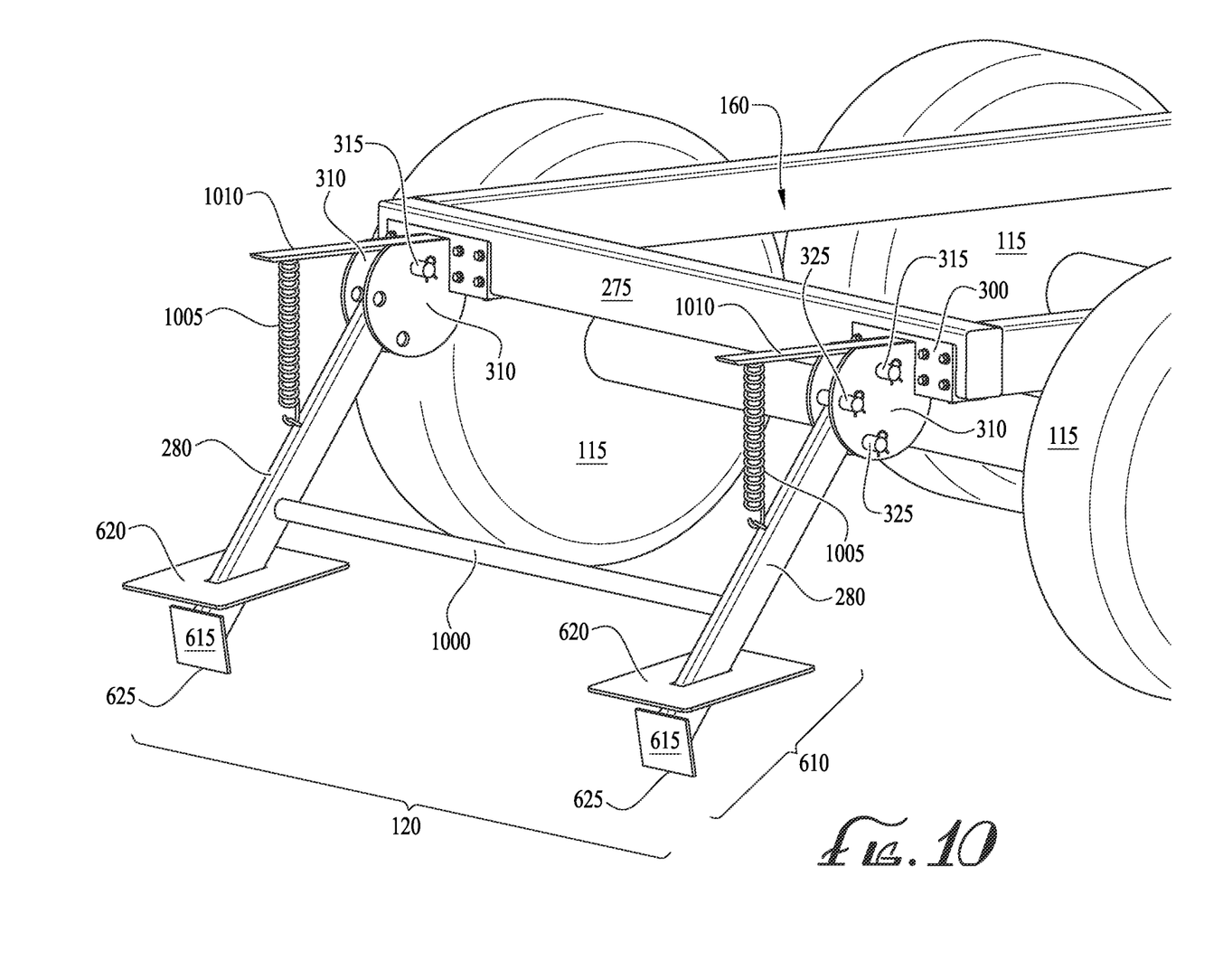
FIG. 10 is a perspective view of a hay trailer bracing system of illustrative embodiments.

Turning to FIG. 10, in some embodiments, spring 1005 may attach between leg 280 and transverse member 275 and/or protrusion 1010 extending from transverse member 275 and/or bracket 300. Springs 1005 may be extended when leg 280 and/or bracing device 120 is in loading position 200, and may be relaxed in travel position 200'. The spring may assist in lifting leg 280 from loading position 200 into travel position 200', particularly where beveled edge 900 and/or cover plate 615 has sunken to a deep and/or maximum position below ground 290 and/or where ground 290 is muddy, sticky and/or wet. Where bracing device 120 has a plurality of legs 280, legs 280 may be spaced apart, such as one on each side of trailer 100 and/or one leg 280 in front of each row 285 of trailer wheels 115. In certain embodiments, a pair and/or two legs 280 may be coupled together with connecting bar 1000 such that such coupled legs 280 move together between travel position 200' and the loading position 200 or vice versa, rather than an operator needing to lift or lower each leg individually. Connecting bar 1000 may be a bar, pipe, tube or beam. In some embodiments, legs 280 may not be connected together and may move independently from one another. Where legs 280 are coupled, attached and/or secured together, in some embodiments, rod 325 may only be needed on one set of mounting plates 310 or in certain embodiments, rod 325 may be employed on each leg 280 as described herein. Where spring 1005 is employed, a first rod 325 may be placed in middle apertures 400b and a second rod 325 may be placed in lower aperture 400c. In this example, the first rod 325 in middle apertures 400b may prevent spring 1005 from raising legs 280 prematurely and/or while loading operations are still taking place. The second rod 325 in lower aperture 400c may prevent over-rotation of leg 280.

Illustrative embodiments may provide a hay trailer stop that may reduce the likelihood that a trailer slips forward or is pushed forward during loading. Legs of a bracing system may pivot to wedge against and/or dig into the ground, which may provide stability during loading. The legs may pivot up off the ground when the trailer is not being loaded and/or when movement of the trailer is desirable. Illustrative embodiments may prevent transmission damage to the tow vehicle and may improve the ease and simplicity of loading an inline hay trailer. The bracing device of illustrative embodiments may attach to any size or type of trailer.

An inline hay trailer bracing device, system and method for rear-loading procedures has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An inline hay trailer bracing system for rear-loading procedures comprising:
    a bracing device configured to be attached to a chassis of an inline trailer bed, the bracing device comprising:
        a pair of elongate legs, each elongate leg comprising two ends:
            a first end having an opening; and
            a second end comprising a foot, the foot further comprising:
                a beveled edge; and
                a pad extending around the elongate leg above the beveled edge; and
        two pairs of rounded plates configured to couple the pair of elongated legs to the chassis, each plate comprising three apertures; and
        wherein for each elongate leg, the bracing device further comprises:
            a pin extending through an upper aperture of one pair of the rounded plates and through the opening of the first end of the elongate leg to pivotably couple the elongate leg to the one pair of the rounded plates; and
            a securing rod moveable between a second aperture and a third aperture of each pair of rounded plates; and
        wherein each elongated leg pivots between:
            a travel position, wherein the foot is configured to be raised substantially parallel to the chassis and the securing rod extends through the second apertures and underneath the elongate leg; and
            a loading position wherein the securing rod extends through the third apertures, and the beveled edge of the foot is configured to engage a ground, thereby bracing the inline trailer bed during rear-loading procedures.

2. The inline hay trailer bracing system of claim 1, wherein a fastener removably secures the securing in one of the second aperture or the third aperture.

3. The inline hay trailer bracing system of claim 1, wherein in the loading position, the pad extends substantially parallel to the ground and is configured to prevent its respective elongate leg from sinking into the ground further than a position where the pad contacts the ground.

4. The inline hay trailer bracing system of claim 1, wherein each leg of the pair of elongate legs is hollow, and the foot further comprises a cover plate extending over the beveled edge, the cover plate arranged about perpendicularly to the pad.

5. The inline hay trailer bracing system of claim 1, wherein in the loading position, the pair of elongate legs extends forward at an acute angle with the ground.

6. The inline hay trailer bracing system of claim 5, wherein the securing rod extends below at least one leg of the pair of elongate legs in the loading position, the securing rod configured to maintain the acute angle.

* * * * *